(12) United States Patent
Thilgen

(10) Patent No.: US 9,762,557 B2
(45) Date of Patent: Sep. 12, 2017

(54) POLICY SETTINGS CONFIGURATION WITH SIGNALS

(71) Applicant: Microsoft Corporation, Redmond, WA (US)

(72) Inventor: Christopher Thilgen, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 52 days.

(21) Appl. No.: 14/525,308

(22) Filed: Oct. 28, 2014

(65) Prior Publication Data

US 2016/0119301 A1    Apr. 28, 2016

(51) Int. Cl.
| | |
|---|---|
| G06F 17/00 | (2006.01) |
| H04L 29/06 | (2006.01) |
| H04W 12/08 | (2009.01) |
| G06F 21/36 | (2013.01) |
| G06F 21/62 | (2013.01) |
| H04L 12/24 | (2006.01) |

(52) U.S. Cl.
CPC .............. *H04L 63/06* (2013.01); *G06F 21/36* (2013.01); *G06F 21/6218* (2013.01); *H04L 41/0893* (2013.01); *H04L 63/20* (2013.01); *H04W 12/08* (2013.01); *G06F 2221/2113* (2013.01); *G06F 2221/2141* (2013.01); *H04L 41/0266* (2013.01)

(58) Field of Classification Search
CPC ........................................................ H04L 63/20
See application file for complete search history.

(56) References Cited

U.S. PATENT DOCUMENTS

| | | | | |
|---|---|---|---|---|
| 7,827,403 | B2 * | 11/2010 | Wong | .................. G06F 21/6227 380/282 |
| 8,613,070 | B1 * | 12/2013 | Borzycki | ............ G06F 21/6218 726/8 |
| 8,689,278 | B2 | 4/2014 | Mihara et al. | |
| 2007/0185980 | A1 | 8/2007 | Abraham et al. | |
| 2011/0167470 | A1 | 7/2011 | Walker et al. | |
| 2012/0240183 | A1 | 9/2012 | Sinha | |
| 2013/0081101 | A1 | 3/2013 | Baer et al. | |
| 2013/0111208 | A1 | 5/2013 | Sabin et al. | |
| 2013/0268668 | A1 | 10/2013 | Abuelsaad et al. | |
| 2013/0283341 | A1 | 10/2013 | Park et al. | |
| 2014/0053126 | A1 | 2/2014 | Watson et al. | |

(Continued)

FOREIGN PATENT DOCUMENTS

WO    2014051861 A1    4/2014

OTHER PUBLICATIONS

"Mobile Device Manager Integration for BYOD", Retrieved on: Jun. 4, 2014, Available at: http://www.cisco.com/c/en/us/td/docs/solutions/Enterprise/Borderless_Networks/Unified_Access/BYOD_Design_Guide/BYOD_MDM_Int.html.

(Continued)

*Primary Examiner* — Taghi Arani
*Assistant Examiner* — Khalil Naghdali
(74) *Attorney, Agent, or Firm* — Talem IP Law, LLP

(57) ABSTRACT

Techniques and systems are disclosed for enabling device configuration using signals that encode device policy settings. A method of configuring policy settings on a host device can include receiving a signal that encodes at least one policy setting; interpreting the signal to determine the at least one policy setting; and applying the at least one policy setting to the host device at its own authority.

15 Claims, 4 Drawing Sheets

(56) References Cited

U.S. PATENT DOCUMENTS

| | | | |
|---|---|---|---|
| 2014/0101257 A1 | 4/2014 | Hunter, Jr. | |
| 2014/0149559 A1 | 5/2014 | Parviainen-Jalanko et al. | |
| 2014/0156472 A1* | 6/2014 | Stuntebeck | G06Q 10/087 705/28 |
| 2014/0309877 A1* | 10/2014 | Ricci | H04W 48/04 701/36 |
| 2014/0337528 A1* | 11/2014 | Barton | H04L 63/10 709/225 |
| 2014/0380402 A1* | 12/2014 | Roth | G06F 21/604 726/1 |
| 2015/0188949 A1* | 7/2015 | Mahaffey | H04L 63/20 726/1 |
| 2015/0281279 A1* | 10/2015 | Smith | H04L 63/20 726/1 |

OTHER PUBLICATIONS

"International Search Report and Written Opinion Issued in PCT Application No. PCT/US2015/057431", Mailed Date: Jan. 22, 2016, 10 Pages.

"Second Written Opinion Issued in PCT Application No. PCT/US2015/057431", Mailed Date: Jun. 13, 2016, 4 Pages.

* cited by examiner

POLICY SETTINGS CONFIGURATION WITH SIGNALS

BACKGROUND

In today's workplace, employees increasingly expect to be able to use personal smartphones, tablets, laptop computers, and other devices on company networks to access company resources like email, file servers, and databases. This phenomenon is sometimes called "Bring Your Own Device", or "BYOD".

Many companies that allow this behavior have implemented security policies to ensure that network security is not compromised and/or that confidential information may be inhibited from being stolen. As a condition for being allowed to use the BYOD device on the company network, employees may configure their devices with specific device policy settings that accord with the demands of the company's security policy. Similar device policy settings controls are also emerging for consumer use, particularly for parental control of children's devices.

BRIEF SUMMARY

Techniques and systems are disclosed for enabling device configuration using signals that encode device policy settings. The disclosed techniques and systems may enable a simplified configuration of device policy settings without the device needing to have an ongoing relationship with a device management provisioning service.

A method of configuring policy settings on a host device with signals can include: receiving a signal that encodes at least one policy setting; interpreting the signal to determine the at least one policy setting; and applying the at least one policy setting to the host device at its own authority.

A host device can include an input decoder that receives a signal encoding at least one policy setting via an input capability of the host device and decodes at least a portion of the signal to generate a decoded signal; and a policy settings component that receives the decoded signal from the input decoder when the decoded signal indicates that the signal is for a policy settings configuration. The policy settings component determines the at least one policy setting from the decoded signal and initiates a modification to a policy settings store of the host device in accordance with the at least one policy setting.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1A:
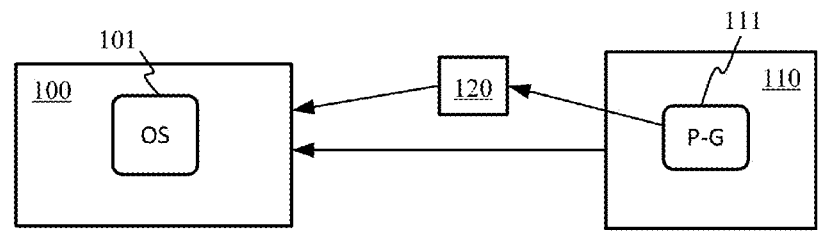
FIGS. 1A-1C illustrate some example operating environments in which certain implementations of systems and techniques for policy settings configuration with signals may be carried out.

Techniques and systems are disclosed for enabling device configuration using signals that encode device policy settings. The disclosed techniques and systems may enable a simplified configuration of device policy settings without the device needing to have an ongoing relationship with a device management provisioning service.

As used herein, a "policy setting" is a device setting that affects access to a resource, in some cases by controlling access to a resource that resides on the device itself or by controlling access to a resource external to the device. Some policy settings permit or restrict a particular behavior by a given user when the user interacts with the device. Examples of policy settings include, but are not limited to, a general device security setting for the device, such as that the device must have hard drive encryption enabled, that a PIN must be set on the device lock screen to prevent unauthorized access, or that manual settings changes (that would reverse the settings enacted by the policy) are disabled; an access setting that enables access to a specific resource, like a company's email system or Wi-Fi network, by providing credentials and configuration information related to the resource; and settings corresponding to specific device capabilities or features, for example controlling the use of a camera or restricting the ability to save files to removable media.

A "host device" or "consumer device" can include smart phones, laptop computers, desktop computers, hybrid computers, tablets, smart televisions, entertainment devices, gaming machines, wearable computers (e.g., watch, eyeglasses) and/or other types of computing devices. A host device is a device that uses the techniques described herein to interpret a signal encoding policy settings and enact those policy settings on itself Depending on the operating system type (e.g., Microsoft Windows®, Apple® iOS™), device type (Motorola phone vs. iPhone, for example), and form factor type (e.g., laptop, tablet, smartphone, smart watch), many different kinds and types of policy settings may be available. Some versions of the Microsoft Windows® operating system, for example, may have several hundred policy settings, ranging from password policies (e.g., the maximum password age, minimum password length, and whether passwords can be reused), to access policies for specific components (e.g., the ability to use the webcam), to more esoteric policy settings (e.g., the encryption algorithm used to encrypt files).

Policy settings may be any policy setting to which a mobile device management controller and a device agree. For example, Windows Intune® MDM server has policy setting capabilities that are variously supported by different devices (e.g., according to the operating system of the device).

These variously supported policy settings include security settings with names such as require a password to unlock mobile device, required password type, minimum password length, allow simple passwords, number of repeated sign-in failures to allow before the device is wiped, minutes of inactivity before screen turns off, password expiration (days), remember password history, password quality, allow picture password and PIN, minutes of inactivity before password is required, allow fingerprint unlock. The variously supported policy settings also include encryption settings with names such as require encryption on mobile device; and malware settings with names such as require network firewall and enable smartscreen.

The variously supported policy settings also include system settings with names such as require automatic updates, allow screen capture, allow notification view in lock screen, user account control, allow untrusted TLS certificates, and allow personal wallet software while locked. The variously supported policy settings also include cloud settings with names such as allow backup to iCloud, allow document sync to iCloud, require encrypted backed, work folders URL; and email settings with names such as allow users to download email attachments, email synchronization period, and allow custom email accounts.

The variously supported policy settings also include application settings (for browsers) with names such as allow web browser, allow autofill, allow pop-up blocker, allow cookies, allow plug-ins, allow active scripting, allow fraud warning, security level for Internet, security level for intranet, security level for trusted sites, security level for restricted sites; and application settings (for apps) with names such as allow application store, require a password to access application store, allow in-app purchases, allow managed documents in other unmanaged apps, allow unmanaged documents in other managed apps, allow video conferencing, allow adult content in media store, allow Game Center friends, and allow multiplayer gaming.

The variously supported policy settings can also include device capabilities settings for hardware, cellular, and features, with names such as allow camera, allow removable storage, allow Wi-Fi, allow Wi-Fi tethering, allow automatic connection to free Wi-Fi hotspots, allow Wi-Fi hotspot reporting, allow geolocation, allow NFC, allow Bluetooth, allow voice roaming, allow data roaming, allow automatic synchronization while roaming, allow voice assistant, allow voice assistant while device is locked, allow voice dialing, and allow copy and paste. It should be understood that the above listing is not exhaustive.

A "signal," as used herein, refers to a visual, audio, tactile, or kinetic pattern that is capable of encoding policy settings and is detectable on a device's input capability. In some cases, the signal may be a visual pattern and thus be detectable by the device's camera, webcam, or other optical sensing device. A signal containing a visual pattern may include a barcode or image. Barcodes may be one-dimensional, two-dimensional, or even three-dimensional (e.g., using time as a dimension such as an animated or video barcode). Example barcodes include MICROSOFT Tag barcodes and Quick Response (QR) codes. Tag and QR codes may be in black-and-white or color. In some cases, a high capacity color barcode (HCCB) may be used.

Figure 1B:
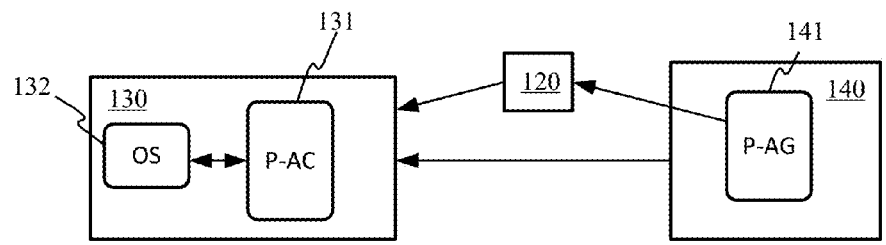
Figure 1C:
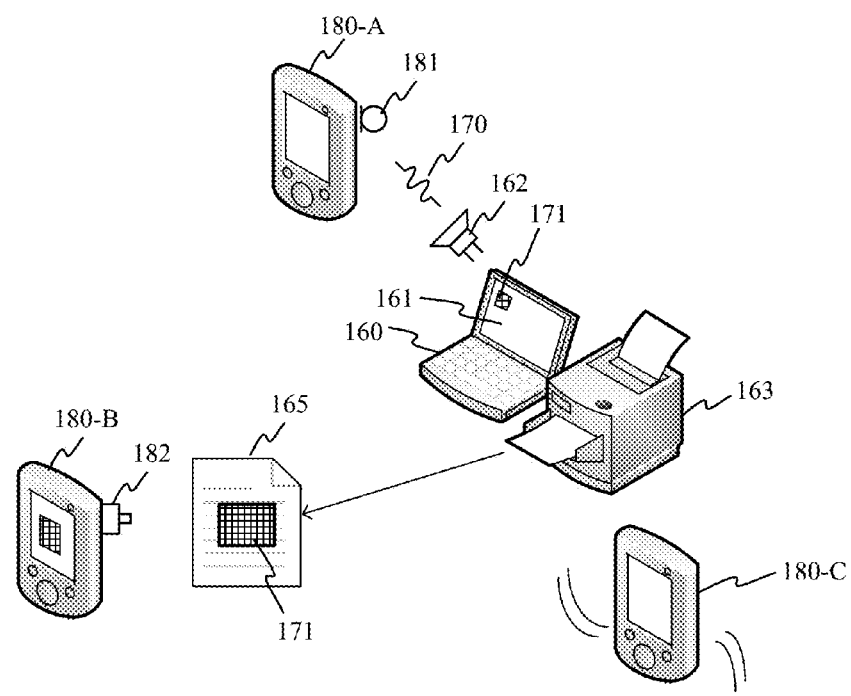

FIGS. 1A-1C illustrate some example operating environments in which certain implementations of systems and techniques for configuring policy settings using signals may be carried out.

Figure 4:
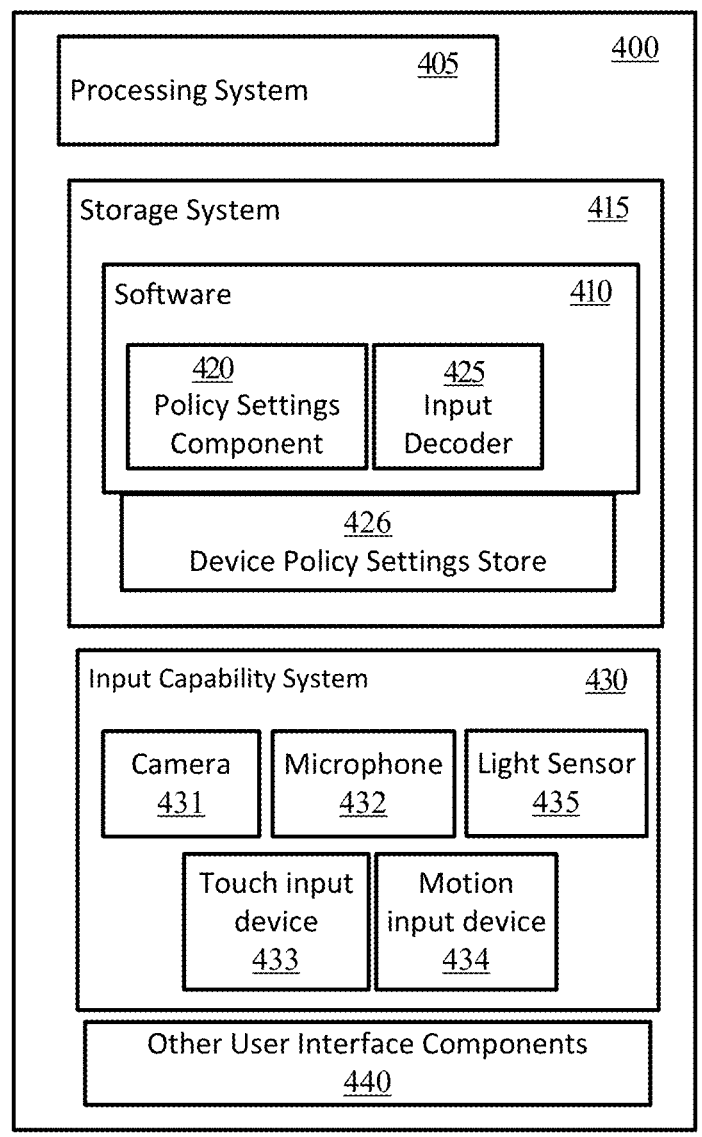
FIG. 4 shows a block diagram illustrating components of devices and systems that may be used to implement the techniques described herein.

Referring to FIG. 1A, a host or consumer device 100 (which may be embodied as computing device 400 described with respect to FIG. 4) includes an operating system (OS) 101 that controls and coordinates the functions of the various components in the device 100, including the policy settings of device 100. To configure the policy settings as described herein for the device 100, a user can, via a separate device 110 use a policy generating tool (P-G) 111 (running locally at the separate device 110 or accessed by the separate device 111 via, for example, a web browsing application).

Figure 3A:
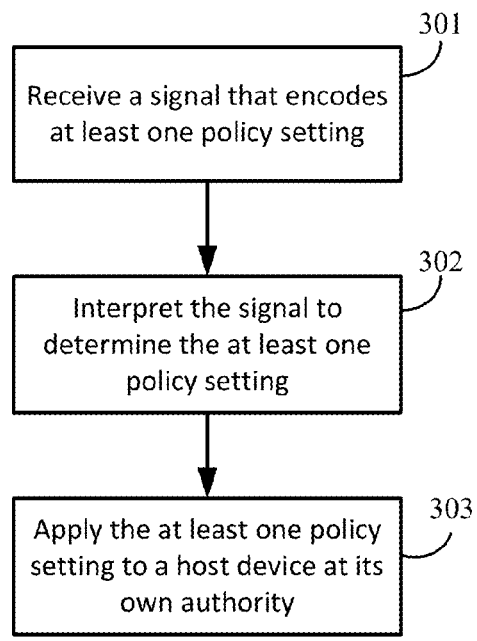
FIG. 3A illustrates an example process flow for policy settings configuration with signals.
Figure 3B:
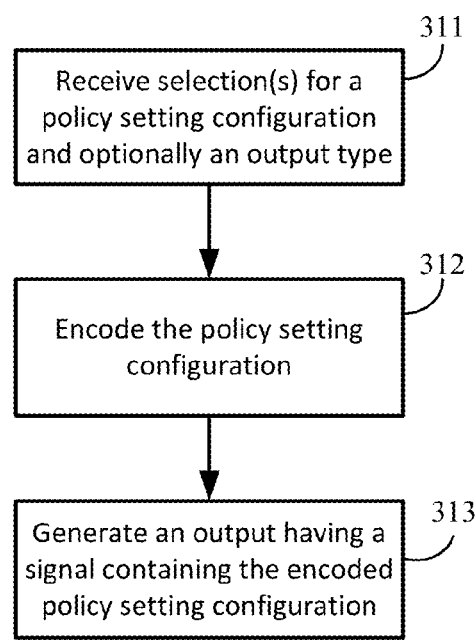
FIG. 3B illustrates an example process flow for generating a policy settings configuration.

The policy generating tool 111 can, as illustrated in FIG. 3B, receive selection(s) for a policy setting configuration (311), encode the policy setting configuration (312), and generate an output having a signal containing the encoded policy setting configuration (313).

In some cases, a policy generating tool 111 is not available for direct communication with a particular operating system (e.g. generating an image on a computer screen that contains encoded policy settings and using the camera on the host or consumer devices to capture and decode the image). Similarly, there may be cases where a mobile device management system or an application-specific policy generating tool is used (and which generates signals not directly understood by a device's operating system). In some of such cases, a host or consumer device 130 (which may be embodied as computing device 400 described with respect to FIG. 4) can include a local policy setting consuming application (P-AC) 131 that interprets a signal encoding at least one policy setting and then communicates with the operating system 132 of that host or consumer device 130 via an application programming interface (API) of the operating system 132, as illustrated in FIG. 1B.

The signal encoding the at least one policy setting can be generated by a particular policy generating application 141 (executed or accessible by device 140) in a with respect to Figure 1A (and FIG. 3B). For example, policy generating application (P-AG) 141 can receive selection(s) for a policy setting configuration (311), encode the policy setting configuration (312) (in this case in a manner understandable by policy generating application 141), and generate an output having a signal containing the encoded policy setting configuration (313). The signal may encode a header so that an input decoder at the host device 100, 130 may direct the signal to an appropriate component.

For built-in support (e.g., the scenario illustrated in FIG. 1A) and third party support (e.g., the scenario illustrated in FIG. 1B), a signal received at a host or consumer device 100, 130 can be interpreted by decoding the signal; and determining a key and value pair corresponding to each of the at least one policy setting encoded by the signal. In some cases, at least one policy setting is encrypted and the encrypted at least one policy setting is decrypted before determining the key and value pair corresponding to each of the at least one policy setting encoded by the signal.

Certain "privileged" applications (applications given the appropriate permissions) have access to the same system level APIs to capture, decode, and/or decrypt signals that may contain settings information and APIs that provide the ability to interact with the local System policy storage (e.g., the policy settings store). Policy setting consuming application 131 may be a component of, or itself be considered, a privileged application.

In some cases, the output may be directly provided by separate device 110 or 140; whereas in other cases, the signal is provided to intermediary 120 in order to be provided to device 100 or 130. The intermediary 120 represents a form of the signal that may be used to communicate the policy settings to the device 100, 130. Examples of intermediary 120 include text, audio, or video instructions; a paper or other substrate on which the signal encoding the one or more policy settings of the policy setting configuration is printed; and/or devices, for example a printer, that may be used to provide the signal and/or instructions.

FIG. 1C illustrates some exemplary scenarios for the signal and communication of the signal. In FIG. 1C, a computing device 160 may be used to perform the process as described with respect to FIG. 3B. For example, a user may perform a policy setting configuration set-up and, in some cases (where supported), select an output type for the signal encoding the policy setting configuration. Computing device 160 may include, as output devices, a display 161, a speaker 162, and a network or other peripheral device communication port.

For a case where an output type of the encoded signal is audio, an encoded audio signal, for example, an audio pattern 170 may be output from the speaker 162 and received by host device 180-A via microphone 181. An illustrative audio pattern 170 is a series of pulses of particular frequencies that spaced apart by particular times (which can be interpreted by a policy consuming application 131 or operating system 101). Another illustrative audio pattern 170 is a voice saying "policy setting configuration, one, five, seven, blue," which is appropriately interpreted by policy consuming application 131 or operating system 101.

For a case where an output type of the encoded signal is visual, an encoded visual pattern, for example, a barcode 171 may be output via display 161 or via an intermediary 120 such as a printer 163 providing a print-out of the barcode 171 onto a paper 165. A host device 180-B can receive the barcode 171 via a camera 182. A specific example of a visual pattern is a QR code that encodes information in a two-dimensional array of blocks (e.g., a matrix of distinctive square blocks). However, the visual pattern may be encoded in a variety of ways, including in a photo or drawing, watermark, or even in the text description of policy settings interpreted by optical character recognition. A visual pattern rendered as a series of light pulses (from a light strobe device) may even be detectable by the device's camera 182 or a light sensor. The strobe light pulses may encode policy settings using standard Morse code, for example, or another type of encoding scheme.

For a case where an output type of the encoded signal is tactile or kinetic, instructions for implementing the tactile or kinetic pattern may be output via display 161, speaker 162, or printer 163 (as non-limiting examples). Then, a host device 180-C having motion sensors such as an accelerometer and/or gyroscope can receive a particular kinetic pattern (e.g., based on instructions indicating a particular number of times to shake the device and then move the device in a big circle). Similarly, a host device may receive tactile patterns through touch sensors available, for example, as part of a touch screen or touch pad.

Several use scenarios will now be described to illustrate certain advantages of the disclosed systems and techniques in various environments. It should be noted that these scenarios are exemplary only and should not be construed as limiting.

In one scenario, a new employee joins a company and wants to use a BYOD smartphone. The new employee may report to the IT department on her first day of work so that her BYOD phone can be configured to be suitable for use in company business. The IT department may change several settings on the phone, such as requiring the employee to enter a PIN code on the lock screen in order to access the phone. The IT department may also, for example, configure the new employee's email accounts, VPN access settings, and Wi-Fi access point settings. Other settings changes may be desired to improve the overall security of the BYOD phone so that company networks and data are protected. The number of settings changes required in some cases may be substantial, and making the changes manually may be time consuming and error-prone.

Using the disclosed techniques, IT department personnel in the example new employee scenario can more rapidly configure the new employee's BYOD phone. IT personnel may choose a selection of policy settings from a policy generating tool 111 or policy generating application 141, and then use the tool or application to encode the settings into a signal. This tool or application may allow a party like an IT professional to specify a device type (e.g., a particular model of mobile phone), operating system (OS) type, or other information and select from a list of policy settings that are available to the device/OS, including general device security policies, available resources, and available accounts. After the settings are chosen, the policy generating tool 111 or policy generating application 141 may encode the settings into a signal for immediate consumption, and/or create a persistent signal for later consumption.

An exemplary signal that may encode the policy settings is a camera-readable QR code, but the signal may be of various kinds—e.g., visual, auditory, kinesthetic, or tactile—that may be understood by the input capabilities of the BYOD phone. The BYOD phone, enabled with the disclosed techniques, may detect the signal using one of its input capabilities and then interpret the signal to decode the settings, configuration, and policy instructions (via the OS, policy setting component of the OS, or policy consuming application 131). The BYOD phone may then apply the settings and configuration changes.

Sometimes, a sufficiently large company may have subscribed to a commercial service or product that provides mobile device management (MDM) services. Examples of commercial MDM services include CITRIX ZENPRISE, SAMSUNG KNOX, WINDOWS INTUNE, and MOBILE-IRON. A commercial MDM service may automate some aspects of the settings changes that may be necessary to properly configure and secure a BYOD device for company business. A commercial MDM service may accomplish this by installing an agent application on the mobile device that maintains an ongoing connection to an MDM server. In some cases, a URL or other configuration code sent to the device via, for example, a text or email may enact the initial login to the MDM server and the initial download and setup of the MDM agent application on the device. After installation, the agent application may make the settings changes, continually monitor the BYOD device's compliance with the company settings requirements, and/or reset settings when necessary.

In contrast, the disclosed techniques may enable the new employee's BYOD device to be set up and configured with the appropriate accounts without creating a relationship with an MDM service and without ongoing monitoring by software agents. Such techniques may be helpful in consumer use scenarios and in small company environments where commercial MDM services may not be affordable.

Furthermore, the BYOD device's current policy settings (prior to applying the new settings encoded in the signal) may be encoded into a "current policy settings" signal before they are changed. The current policy settings signal (e.g., QR code) may be saved to a file and/or printed. This enables the device to be returned to its former settings on demand, for example during the employee's HR exit interview when she leaves the company.

In another scenario, a customer purchases a new tablet computer in a retail store. Before leaving the store, the retail clerk asks the customer if she would like to have her new tablet configured and secured for home use. The customer agrees, and the clerk sits down with the customer at a computer running a policy generating tool 111 or policy generating application 141 and asks the customer several questions about how she plans to use the new tablet. The clerk selects the customer's tablet model and then selects several options from the policy generating tool 111 or policy generating application 141, such as that the tablet lock screen should be unlocked by facial recognition rather than slide, that the customer prefers a different default SMS receiving application, and that the device storage should be encrypted.

The policy generating tool 111 or policy generating application 141 encodes the settings into a QR code that is then displayed on the clerk's computer display. The clerk assists the customer in launching a QR code reader on her new tablet, which she uses to scan the policy settings QR code using the tablet's camera. The QR code is interpreted by a component implementing the proposed techniques (e.g., a policy consuming application 131 or OS 101 component) to determine the encoded policy settings. The policy settings are then applied to the tablet. As the settings are applied, the customer may sometimes provide additional input at the tablet in response to user input prompts, e.g., to take the photo of herself to be used by the facial recognition unlock screen.

When the customer leaves the store, no persistent connection has been established between the tablet and the clerk's authoring program, and no relationship with an MDM provisioning server has been required. In some cases, the clerk also may give the customer a paper print-out of the QR code so that the customer can re-apply the policy settings in the future, in the event that the device needs to be reset or the device becomes inoperative because settings were accidentally changed.

In another scenario, a small company contracts with a new programmer to work on a project as an independent contractor. The project is expected to last four months. The company is small enough that it does not have the need or resources to subscribe to a commercial MDM service. However, the company does want to ensure that company data cannot be accessed if the programmer's device is lost or stolen.

On his first day of work, the new programmer brings his personal laptop to the company, where the office manager has access to a policy generating tool 111 or policy generating application 141 for encoding policy settings in a QR code. The office manager asks the new programmer to download an application that can use the camera to receive and interpret QR codes that encode policy settings for the OS on the laptop. In some cases, an application or system component having these capabilities may already be present on the laptop. Meanwhile, the office manager selects several policy settings from the policy generating tool 111 or policy generating application 141, including, e.g., to require whole-drive encryption on the laptop, to require that the programmer secure the laptop login screen with a password of at least 8 characters, and the company's Wi-Fi network credentials. The office manager also sets a four-month expiration date for the newly selected policy settings.

As before, the policy generating tool 111 or policy generating application 141 encodes the settings onto a QR code that is then displayed on the office manager's computer display. The new programmer launches the QR code reader on the laptop, which he uses to scan the policy settings QR code using the laptop's webcam. The QR code is interpreted by a policy settings component (e.g., policy consuming application 131 or OS 101 component) on the device to determine the new policy settings. The component may also save the old policy settings values for the pertinent settings that will be changed. The new policy settings are then applied to the laptop by the component. No persistent connection has been established between the laptop and the office manager's policy generating tool 111 or policy generating application 141, and no relationship with an MDM provisioning server has been required. In four months, when the project is over, the component (at the contractor's device) will reverse the policy settings changes by reapplying the older, saved policy settings; the independent contractor is ready to move on to the next job with an unaltered device, and the company's Wi-Fi credentials are no longer accessible by the contractor's device.

Certain technical advantages may be realized in the functioning of a device implementing the disclosed techniques and systems. Some devices may have many hundreds of policy settings, some of which may have cryptic terminology. In some cases, policy settings may be interrelated or co-dependent on one another such that changing a policy setting while neglecting to change (or inconsistently changing) a co-dependent setting may cause anomalous behaviors. Sometimes, the device may cease to work at all if policy settings changes are improperly applied, a common enough occurrence that it is sometimes called "bricking" the device.

A semi-automated, stand-alone (i.e., not needing an MDM service) mechanism for policy settings configuration, such as disclosed herein, may advantageously reduce the errors and inconsistencies in setup that may in some cases cause the device to function poorly or stop functioning altogether. Policy settings may be selected using a policy generating tool 111 or policy generating application 141 that veils the complexity of settings names and co-dependencies. Such a policy generating tool 111 or policy generating application 141 may provide verification checking of policy setting consistency as well as simplified template-based policy settings.

Sometimes, devices that have un-configured policy settings may be less secure from malware. "Malware" refers to software code that maliciously affects user data, improperly accesses user data, or otherwise negatively affects the functioning of the device; some malware may propagate rapidly through networks of devices that have less effective policy settings. Techniques and systems disclosed herein may enhance the current or future functioning of the device by enabling consumers and IT personnel to implement more effective security policy settings that reduce susceptibility to malware. Techniques and systems allow the policy settings to be implemented on the device without the intermediation of complex and expensive MDM services, both of which can be barriers to use of traditional MDM services.

Figure 2:
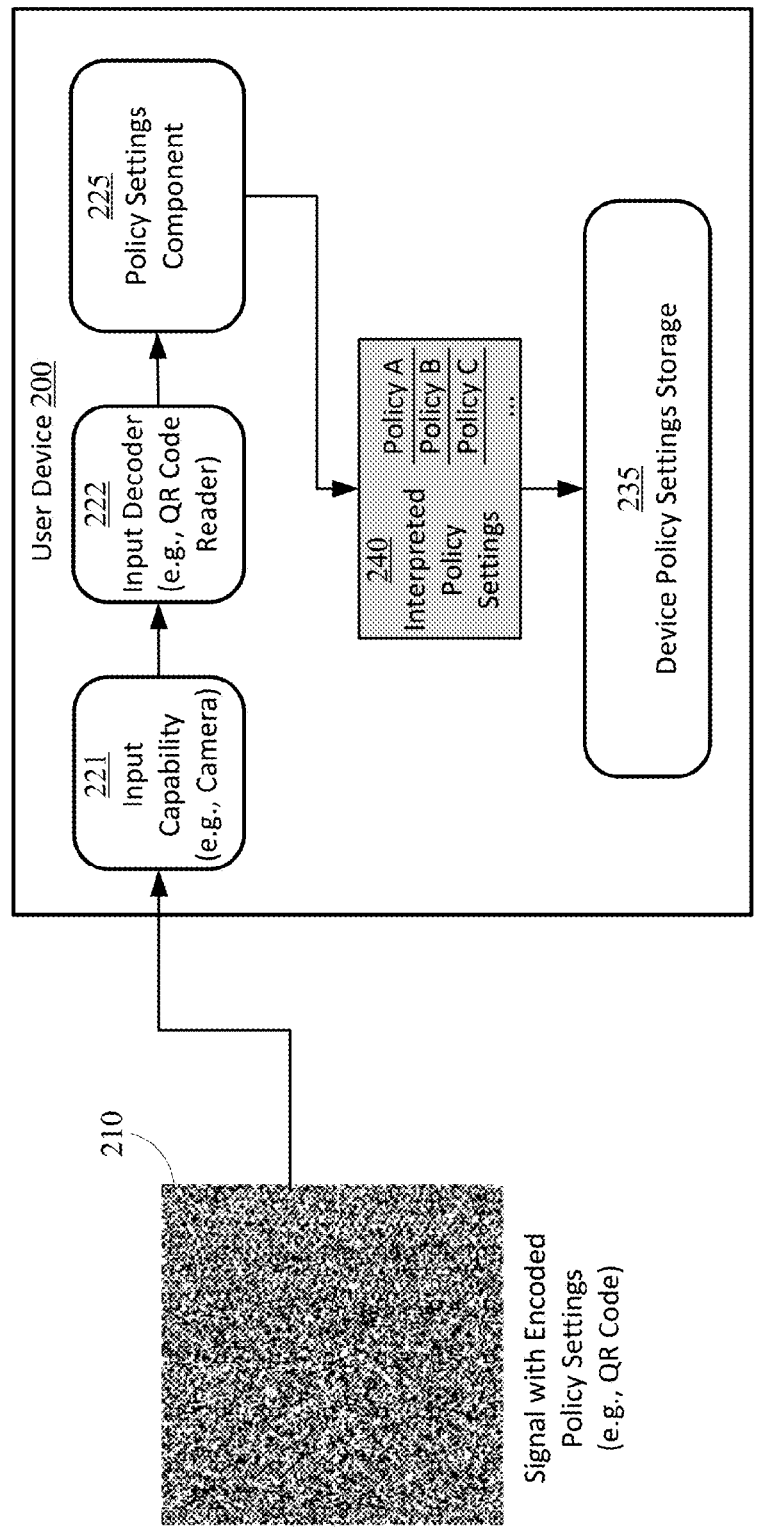
FIG. 2 illustrates an example implementation of a policy settings configuration with signals.

FIG. 2 illustrates an example implementation of a policy settings configuration with signals. In FIG. 2, the settings are encoded in a signal with a visual pattern, represented by a QR code. The QR code is exemplary only and should not be construed as limiting of the types and varieties of signals that may encode policy settings, including other visual patterns as well as audio, tactile, and kinetic patterns as described herein.

In FIG. 2, a user device 200 can receive QR code signal 210. In some implementations, user device 200 may include device components such as an input capability (represented here by a camera) 221, input decoder (represented here by a QR code reader) 222, policy settings component 225, and device policy settings store 235. In some cases, policy settings component 225 may implement certain techniques disclosed herein, such as those described with respect to the process flow of FIG. 3A.

Policy settings component 225 may interact with one or more other components on the user device 200 in order to receive and decode the QR code input signal 210. In FIG. 2, for example, policy settings component 225 can decode policy settings encoded in a QR code signal 210 that the user device 200 receives via the device camera 221.

A QR code may hold variable amounts of data depending on the QR code format version, what kind of data is encoded (e.g., binary, numeric, alphanumeric, or kanji), and the level of error correction used. QR code format versions currently come in variations numbered 1-40. Generally, the higher the version, the greater the amount of data can be encoded. For example, QR code format Version 40 has a grid size of 177×177 "modules" (the black and white dots representing units of information in the QR code) capable of encoding between 1,852 and 4,296 alphanumeric characters, depending on which of four error correction levels is used (error correction allows the information in the QR code to still be read when the QR code is damaged).

In some implementations, the policy settings components 225 may communicate with a QR code reader application or component 222 to decode the QR code signal input received by the device camera 221. The QR code reader application or component 222 may sometimes be provided by the OS vendor; sometimes, the QR code reader 222 may be an add-on device application or mobile device "app" available commercially. An example of a commercial QR code reader is "QR Code Reader" from Scan, Inc. In cases where the QR code reader 222 functionality is a separate component from the policy settings component 225, the QR code reader application or component 222 may direct the decoded data stream to the policy settings component 225 by recognizing a descriptive header (e.g., binary code or text string) at the beginning of the QR code data. By recognizing that the QR code 210 encodes policy settings, a generalized QR code reader may launch the policy settings component 225 to interpret the settings. This contrasts with a case in which, for example, a QR code recognizes an encoded URL, which might cause the QR code reader 222 to launch a web browser.

In some implementations, the QR code reading capability may be performed as a function of the policy settings component 225. For example, if policy settings have been encrypted before being encoded into a signal, policy settings component 225 may perform the QR code reading function so that the settings may be decrypted in addition to being decoded.

In some implementations, the intervention of a user may be required to initiate the QR code reader 222 or policy settings component 225 to engage the device camera 221 to receive the QR code signal 210. In some cases, policy settings component 225 may surface one or more user interface features as part of receiving and decoding the QR code 210. For example, if policy settings component 225 contains a built-in QR code reader, policy settings component 225 may display an interface for aiming the camera 221 so that the QR code 210 may be centered and read. If the policy settings component 225 uses a separate QR code reader 222, the policy settings component 225 may display a user interface requesting that the user install or select an already-installed QR code reader 222 to read the QR code 210. Sometimes, the policy settings component 225 may request that the device owner assent to change the settings, for example by displaying an approval dialog or requiring the entry of a device password or PIN.

Policy settings component 225 may operate to interpret one or more policy settings from the QR code 210. The interpreted policy settings 240 may be used to apply alterations or updates to the settings information stored in a device policy settings store 235 that may be included on some user devices.

A device policy settings store 235 retains device policy settings keys and their values. For example, a policy settings "key" might be the "minimum length of a password" and the "value" might be "8" (meaning 8 characters long). A device policy settings store 235 can be stored in various ways, depending on the type of device and/or OS. For example, on MICROSOFT WINDOWS, the device policy settings may be stored in the Registry; on GOOGLE ANDROID, the policy settings may be stored in the Settings Database, which resides a file located in a secure area of the Android file system.

In some implementations, various kinds of policy settings may be stored in different settings store localities, hence the term "device policy settings store" describes a logical concept rather than a singular physical location. For example, local security policies may be stored in one kind of policy settings store 235, and Wi-Fi network identifiers may be retained in a different policy settings store. In some cases, the device policy settings store 235 may be accessible to components with an application programming interface (API), provided by the OS for the device, that enables simplified access to specific policy settings using standardized function calls from component code.

Interpreted policy settings 240 are depicted logically as a series of discrete policy settings that are processed by the policy settings component 225 from the decoded signal (QR code). In some implementations, the policy settings decoded from the QR code or signal, may include both a settings key and a settings value. In some cases, the format for storing these settings key/value pairs may be an Extensible Markup Language (XML) format, The XML format may be operable only to the policy settings component 225, or the policy settings key/value pairs may be described in an industry-standard XML format like the Open Mobile Alliance Device Management (OMA DM) protocol. Naturally, other storage formats, including comma- or tab-delimited text, are also possible.

In some implementations, the XML policy settings key/value pairs may be encoded directly on the QR Code or signal. The policy settings component 225 may interpret the XML policy settings key/value pairs and transform them into commands for updating the device policy settings store 235. In some cases, the commands for updating or applying changes to the device policy settings store 235 may be commands to execute specific API calls through an OS layer to the device policy settings store 235 (e.g., such as described with respect to FIG. 1B).

In some implementations, policy settings component 225 may interpret the policy settings by reordering the decoded series of policy settings from the order stored on the QR code. The reordered policy settings may be more efficiently or effectively executed on a specific device type or OS type. In some cases, policy settings may be grouped or nested together when they relate to a specific device policy settings store 235. In some cases, multiple policy settings alterations may be transacted so that commands to apply the policy settings either succeed or fail as a group, and an inconsistent or inoperable device state does not result from partial changes.

FIG. 3A illustrates an example process flow for policy settings configuration with signals. A policy settings component 225, such as described with respect to FIG. 2, may implement the process.

Referring to FIG. 3A, a policy settings component 225 may receive a signal that encodes at least one policy setting (301). As discussed with respect to FIG. 2, policy settings component 225 can interact with other system and application components on the device. Sometimes, the policy settings component 225 may use a device's input capability/component 221, like a camera or microphone, to receive a signal.

The policy settings component 225 may then interpret the signal to determine the policy settings that comprise the signal (302). Interpreting the signal may include decoding the encoded signal, determining the specific series of policy settings that need value changes in the device policy settings store 235, and, in some implementations, decrypting a policy setting that is encrypted.

Sometimes, the policy settings component 225 may use a signal input decoder 222, like a QR code reading application or component, to decode the signal. In some cases, a policy settings component 225 may provide its own input decoder; this may occur when, for example (as in some embodiments), some or all of the information encoded on the signal is also encrypted to ensure the privacy of data like network passwords.

An outcome of the process of decoding and interpreting is a set of interpreted policy settings 240. As noted with respect to FIG. 2, interpreted policy settings 240 may be reordered, grouped together, or transacted in a manner different from how they were encoded.

The interpreted policy settings 240 may then be applied to the host device at its own authority (303). In some implementations, applying the settings may mean that the policy settings component 225 executes specific commands to alter the device policy settings store 235 in accordance with the new values for the policy settings. In some cases, changes may be applied directly to the device policy settings store; in some cases, the new values for the policy settings may be applied via an intermediary API provided by the device or operating system.

Moreover, policy settings component 225 can apply the policy settings to the host device at its own authority. "At its own authority" means that the policy settings component 225 has the security privileges on the device to alter device policy settings on the host device. "At its own authority" further means that the policy settings component 225 and the host device do not require an ongoing relationship or communication with an MDM provisioning server, or with the policy settings authoring program.

Sometimes, a prompt to the user may be helpful for certain policy settings values that may need personalized input. In some implementations, policy settings component 225 may surface one or more user interfaces to show the user the prompt and/or allow user input to be gathered in reference to a specific policy settings value. For example, if a policy setting is changed so that the user's device lock screen must use facial recognition to identify the user before unlocking, the user may need to be prompted for input to select (or take) a photograph of the user's face for comparison. In some implementations, the policy settings component 225 may consolidate one or more prompts for user input into a single user interface.

In some implementations, the policy settings component 225 may output a signal (perhaps by displaying an output QR code) encoding the prior policy settings and values that were changed by the operations in the process of FIG. 3A. Such an implementation enables reversal of the changes in the input signal so that the policy settings may be returned to their prior values at a later time. Thus, a temporary user like a social or business guest, or a short-term contract worker, may temporarily use a company or home network with the required policy settings and still be able to easily and quickly return his or her device to its prior policy settings after the temporary period has elapsed.

In some implementations, the policy settings component 225 may save the prior policy settings in a file or database instead of encoding the policy settings in a signal.

In some implementations, the signal that encodes the policy settings may contain an expiration time such that the policy settings component 225 may enact the encoded policy settings only until a specified time. After the expiration time of the new policy settings has elapsed, the policy settings component 225 may re-apply the device's saved, prior policy settings. The host device's policy settings are thus returned to the former values before the host device received the signal. Such an implementation may allow a party using policy settings configuration with signals (e.g., a company hiring a project-based independent contractor) to ensure that temporary access granted to resources does not continue beyond a specific time without reauthorization.

Sometimes, more policy settings may need to be changed than can be recorded in a single signal. As noted, a "version 40" QR code has an effective maximum capacity of around 4K characters. In some implementations, an authoring program may encode more than one signal, each of which contains a partition of the policy settings, and encode on each signal partition a number of partitions and a sequencing number. Consequently, the policy settings component 225 may be able to receive, decode, and interpret all partitions before applying the totality of the changed settings to the host device.

FIG. 3B illustrates an example process flow for generating a policy settings configuration. As explained above, a policy settings generator can include a user interface (e.g., a graphical user interface) through which selection(s) for a policy setting configuration can be received (311). Optionally, a selection as to the type of output signal that encodes the policy setting configuration may be made through the user interface. Based on the particular policy settings that are to be applied to a particular device (and optionally, a selection of a particular output type for the signal), the policy settings generator can encode the policy setting configuration (312) and generate an output having a signal containing the encoded policy setting configuration (313).

FIG. 4 shows a block diagram illustrating components of devices and systems that may be used to implement the techniques described herein.

Referring to FIG. 4, device 400 may represent a computing device such as, but not limited to, a personal computer, a tablet computer, a reader, a mobile device, a personal digital assistant, a wearable computer, a smartphone, a laptop computer (notebook or netbook), a gaming device or console, a desktop computer, or a smart television. Accordingly, more or fewer elements described with respect to device 400 may be incorporated to implement a particular computing device.

Device 400, for example, includes a processing system 405 of one or more processors to transform or manipulate data according to the instructions of software 410 stored on a storage system 415. Examples of processors of the processing system 405 include general purpose central processing units, application specific processors, and logic devices, as well as any other type of processing device, combinations, or variations thereof.

The software 410 can include an operating system and application programs or components such as a policy settings component 420 and/or input decoder 425 (225 and 222 of FIG. 2, respectively). An input decoder, e.g., a QR code reader, may transform encoded signals into decoded information. Device operating systems generally control and coordinate the functions of the various components in the computing device, providing an easier way for applications to connect with lower level components like input devices or capabilities. Non-limiting examples of operating systems include Windows® from Microsoft Corp., Apple® iOS™ from Apple, Inc., Android® OS from Google, Inc., and the Ubuntu variety of the Linux OS from Canonical.

It should be noted that the operating system may be implemented both natively on the computing device and on software virtualization layers running atop the native device operating system (OS). Virtualized OS layers, while not depicted in FIG. 4, can be thought of as additional, nested groupings within the operating system space, each containing an OS, application programs, and APIs.

Storage system 415 may comprise any computer readable storage media readable by the processing system 405 and capable of storing software 410, including the policy settings component 420.

Storage system 415 may include volatile and nonvolatile, removable and non-removable media implemented in any method or technology for storage of information, such as computer readable instructions, data structures, program modules, or other data.

Examples of storage media include random access memory (RAM), read only memory (ROM), magnetic disks, optical disks, CDs, DVDs, flash memory, solid state memory, phase change memory, or any other suitable storage media. Certain implementations may involve either or both virtual memory and non-virtual memory. In no case do storage media consist of a propagated signal or carrier wave. In addition to storage media, in some implementations, storage system 415 may also include communication media over which software may be communicated internally or externally.

Storage system 415 may be implemented as a single storage device but may also be implemented across multiple storage devices or sub-systems co-located or distributed relative to each other. Storage system 415 may include additional elements, such as a controller, capable of communicating with processor 405.

Software 410 may be implemented in program instructions and among other functions may, when executed by device 400 in general or processing system 405 in particular, direct device 400 or the one or more processors of processing system 405 to operate as described herein for enabling policy settings configuration with signals.

In general, software may, when loaded into processing system 405 and executed, transform computing device 400 overall from a general-purpose computing system into a special-purpose computing system customized to receive and decode policy settings signals and to interpret and apply policy settings changes as described herein for each implementation. Indeed, encoding software on storage system 415 may transform the physical structure of storage system 415. The specific transformation of the physical structure may depend on various factors in different implementations of this description. Examples of such factors may include, but are not limited to the technology used to implement the storage media of storage system 415 and whether the computer-storage media are characterized as primary or secondary storage.

The storage system 415 can further include device policy settings store 426. The device policy settings store may be one or more files or databases containing policy settings used by operating system to control the functioning and behavior of the device. As noted with respect to element 235 of FIG. 2, device policy settings store 426 may be the storage location for policy settings that are altered (or read) by the policy settings component, either directly or through an API software layer provided by the OS.

The system can further include input capability system 430, which may include input devices and components that enable different types of signals—e.g., visual, auditory, tactile, and kinetic—to be received by the device 400. Input capability system 430 can include input devices such as a camera for detecting visual input 431, a microphone for detecting speech or sounds 432, a touch device 433 for receiving a touch gesture from a user, a motion input device 434 for detecting non-touch gestures and other motions by a user, a light sensor for detecting pulses of light or non-visible wavelengths of light 435, and other types of input devices and their associated processing elements capable of receiving signal-based input.

Other user interface components 440 may include other input components such as a mouse, keyboard, and display. Other user interface components 440 may also include output devices such as display screens, speakers, haptic devices for tactile feedback, and other types of output devices. In certain cases, the input and output devices may be combined in a single device, such as a touchscreen display which both depicts images and receives touch gesture input from the user. Visual output may be depicted on the display in myriad ways, presenting graphical user interface elements, text, images, video, notifications, virtual buttons, virtual keyboards, or any other type of information capable of being depicted in visual form.

Other user interface components 440 may also include user interface software and associated software (e.g., for graphics chips and input devices) executed by the OS in support of the various user input and output devices. The associated software assists the OS in communicating user interface hardware events to application programs using defined mechanisms. The user interface system 430 including user interface software may support a graphical user interface, a natural user interface, or any other type of user interface.

A communication interface (not shown) may be included, providing communication connections and devices that allow for communication between device 400 and other computing systems (not shown) over a communication network or collection of networks (not shown) or the air. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

It should be noted that many elements of device 400 may be included in a system-on-a-chip (SoC) device. These elements may include, but are not limited to, the processing system 405 and elements of the storage system 415.

Computing device 400 is generally intended to represent a computing system with which software is deployed and executed in order to implement an application or component for policy settings configuration with signals as described herein.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Certain aspects of the invention provide the following non-limiting embodiments:

Example 1. A method of configuring policy settings on a host device comprising: receiving a signal that encodes at least one policy setting; interpreting the signal to determine the at least one policy setting; and applying the at least one policy setting to the host device at its own authority.

Example 2. The method of example 1, wherein the signal comprises a visual pattern of a barcode.

Example 3. The method of example 2, wherein the barcode is a QR code.

Example 4. The method of example 1, wherein the signal comprises a visual pattern, an audio pattern, tactile, kinetic pattern, or combination thereof.

Example 5. The method of any of examples 1-4, wherein the at least one policy setting is described in XML.

Example 6. The method of any of examples 1-5, further comprising generating an output signal that encodes one or more prior policy settings.

Example 7. The method of any of examples 1-6, wherein applying the at least one policy setting to the host device at its own authority comprises: initiating a modification to a policy setting store of the host device in accordance with one or more of the at least one policy setting.

Example 8. The method of any of examples 1-7, wherein the at least one policy setting comprises one or more of a device security setting and a resource access setting.

Example 9. The method of any of examples 1-8, wherein interpreting the signal comprises: decoding the signal; and determining a key and value pair corresponding to each of the at least one policy setting encoded by the signal.

Example 10. The method of example 9, wherein at least one policy setting is encrypted, wherein interpreting the signal further comprises: decrypting the at least one policy setting before determining the key and value pair corresponding to each of the at least one policy setting encoded by the signal.

Example 11. The method of any of examples 1-10, further comprising saving one or more prior policy settings.

Example 12. The method of example 11, wherein the signal further encodes an expiration time for the at least one policy setting, and the method further comprises: applying the one or more prior policy settings to the host device after the expiration time has elapsed.

Example 13. A system comprising: one or more computer readable storage media; program instructions for a component stored on at least one of the one or more computer readable storage media that, when executed by a processing system, direct the processing system to: in response to receiving a signal that encodes at least one policy setting, interpret the signal to determine the at least one policy setting and apply the at least one policy setting to the system on its own authority.

Example 14. The system of example 13, wherein the at least one policy setting comprises a device security setting.

Example 15. The system of example 13 or 14, wherein the at least one policy setting comprises a resource access setting.

Example 16. The system of any of examples 13-15, wherein the at least one policy setting is described in XML.

Example 17. The system of any of examples 13-16, wherein the program instructions, when executed by the processing system, further direct the processing system to generate an output signal that encodes one or more prior policy settings.

Example 18. The system of any of examples 13-17, wherein the signal comprises a visual pattern of a barcode.

Example 19. The system of example 18, wherein the barcode is a QR code.

Example 20. The system of any of examples 13-17, wherein the signal comprises a visual pattern, an audio pattern, tactile, kinetic pattern, or combination thereof.

Example 21. The system of any of examples 13-20, wherein the program instructions that direct the processing system to apply the at least one policy setting to the system on its own authority, comprise instructions to initiate a modification to a policy setting store of the system in accordance with one or more of the at least one policy setting.

Example 22. The system of any of examples 13-21, wherein the program instructions that direct the processing system to interpret the signal comprise instructions to: decode the signal; and determine a key and value pair corresponding to each of the at least one policy setting encoded by the signal.

Example 23. The system of any of examples 13-22, wherein at least one policy setting is encrypted, wherein the program instructions that direct the processing system to interpret the signal further comprise instructions to: decrypt the at least one policy setting before the key and value pair corresponding to each of the at least one policy setting encoded by the signal is determined.

Example 24. The system of any of examples 13-23, wherein the program instructions further comprise instructions that direct the processing system to save one or more prior policy settings.

Example 25. The system of example 24, wherein the signal further encodes an expiration time for the at least one policy setting, and the program instructions further comprise instructions that direct the processing system to: apply the one or more prior policy settings to the host device after the expiration time has elapsed.

Example 26. A device comprising: a processing system; an input capability; one or more computer readable storage media; a policy settings store stored on the one or more computer readable media; program instructions for a component stored on at least one of the one or more computer readable storage media that, when executed by the processing system, direct the processing system to: receive, via the input capability, a signal that encodes at least one policy setting; interpret the signal to determine the at least one policy setting; and initiate a modification to the policy settings store in accordance with the at least one policy setting.

Example 27. The system of example 26, wherein the signal comprises a visual pattern, an audio pattern, tactile, kinetic pattern, or combination thereof.

Example 28. The device of example 26, wherein the input capability is a camera and the signal comprises a barcode.

Example 29. The system of example 28, wherein the barcode is a QR code.

Example 30. The device of any of examples 26-29, wherein the at least one policy setting comprises one or more of a device security setting and a resource access setting.

Example 31. The device of any of examples 26-30, wherein at least one policy setting is encrypted and wherein the program instructions that direct the processing system to interpret the signal comprise instructions that direct the processing system to decrypt the at least one policy setting.

Example 32. The system of any of examples 26-31, wherein the program instructions that direct the processing system to interpret the signal comprise instructions to: decode the signal; and determine a key and value pair corresponding to each of the at least one policy setting encoded by the signal.

Example 33. The device of any of examples 26-32, wherein the at least one policy setting is described in XML.

Example 34. The device of any of examples 26-33, wherein the program instructions, when executed by the processing system, further direct the processing system to save one or more prior policy settings.

Example 35. The device of any of examples 26-34, wherein the signal further encodes an expiration time for the at least one policy setting, and the program instructions, when executed by the processing system, further direct the processing system to initiate, after the expiration time has elapsed, a reverting modification to the policy settings store in accordance with the one or more prior policy settings.

Example 36. The device of any of examples 26-35, wherein the program instructions, when executed by the processing system, further direct the processing system to generate an output signal that encodes one or more prior policy settings.

Example 37. A system comprising: a means for receiving a signal that encodes at least one policy setting; a means for interpreting the signal to determine the at least one policy setting; and a means for applying the at least one policy setting to the host device at its own authority.

Example 38. A method comprising: receiving selection(s) for a policy setting configuration, encoding the policy setting configuration, and generating an output having a signal containing the encoded policy setting configuration.

Example 39. The method of example 38, wherein the signal comprises a visual pattern, an audio pattern, tactile, kinetic pattern, or combination thereof.

Example 40. A system comprising: a means for receiving selection(s) for a policy setting configuration, a means for encoding the policy setting configuration, and a means for generating an output having a signal containing the encoded policy setting configuration.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method of configuring policy settings on a host device comprising:
   receiving, via an input capability of the host device, a signal that encodes at least one policy setting of the host device, wherein the signal comprises a visual pattern, an audio pattern, a tactile pattern, a kinetic pattern, or combination thereof;
   interpreting the signal, at the host device, to determine the at least one policy setting, wherein interpreting the signal comprises:
   decoding the signal,
   decrypting the at least one policy setting before determining a key and value pair corresponding to each of the at least one policy setting encoded by the signal, and
   determining the key and value pair corresponding to each of the at least one policy setting encoded by the signal; and
   applying the at least one policy setting to the host device by the host device at its own authority for altering the at least one policy setting without a communication with a server.

2. The method of claim 1, wherein applying the at least one policy setting to the host device by the host device at its own authority comprises:
   initiating a modification to a policy setting store of the host device in accordance with one or more of the at least one policy setting.

3. The method of claim 1, wherein the at least one policy setting comprises one or more of a device security setting and a resource access setting.

4. The method of claim 1, further comprising saving, at the host device, one or more prior policy settings.

5. The method of claim 4, wherein the signal further encodes an expiration time for the at least one policy setting, and the method further comprises: applying the one or more prior policy settings to the host device after the expiration time has elapsed.

6. A system comprising:
   one or more computer readable storage media that do not consist of a propagated signal or carrier wave;
   program instructions for a component stored on at least one of the one or more computer readable storage media that do not consist of the propagated signal or carrier wave that, when executed by a processing system of a host device, direct the processing system to:
   interpret a signal that encodes at least one policy setting for the host device to determine the at least one policy setting, the signal comprising a visual pattern, an audio pattern, a tactile pattern, a kinetic pattern, or combination thereof, wherein interpreting the signal comprises:
   decoding the signal,
   decrypting the at least one policy setting before determining a key and value pair corresponding to each of the at least one policy setting encoded by the signal, and
   determining the key and value pair corresponding to each of the at least one policy setting encoded by the signal: and
   communicate with or as part of an operating system of the host device to apply the at least one policy setting to the host device so the host device alters the at least one policy setting on its own authority for altering the at least one policy setting without a communication with a server.

7. The system of claim 6, wherein the at least one policy setting comprises at least one of a setting to enforce a PIN on a lock screen, access to a company Wi-Fi access point, and a VPN connection setting.

8. The system of claim 6, wherein the at least one policy setting comprises at least one of a setting that limits internet access to particular hours, a setting affecting store purchases, and a setting that blocks a specified application.

9. The system of claim 6, wherein the at least one policy setting is described in XML.

10. The system of claim 6, wherein the program instructions, when executed by the processing system, further direct the processing system to generate an output signal that encodes one or more prior policy settings.

11. A device comprising:
   a processing system;
   a camera;
   one or more computer readable storage media that do not consist of a propagated signal or carrier wave;
   a policy settings store stored on the one or more computer readable media that do not consist of the propagated signal or carrier wave; program instructions for a component stored on at least one of the one or more computer readable storage media that do not consist of the propagated signal or carrier wave that, when executed by the processing system, direct the processing system to:
   receive, via the camera, a signal that encodes at least one policy setting for the device, wherein the signal comprises a barcode;
   interpret the signal to determine the at least one policy setting, wherein the at least one policy setting is encrypted and wherein the program instructions that direct the processing system to interpret the signal comprise instructions that direct the processing system to decrypt the at least one policy setting: and
   initiate a modification to the policy settings store in accordance with the at least one policy setting.

12. The device of claim 11, wherein the at least one policy setting comprises one or more of a device security setting and a resource access setting.

13. The device of claim 11, wherein the at least one policy setting is described in XML.

14. The device of claim 11, wherein the program instructions, when executed by the processing system, further direct the processing system to save one or more prior policy settings.

15. The device of claim 14, wherein the signal further encodes an expiration time for the at least one policy setting, and the program instructions, when executed by the processing system, further direct the processing system to initiate, after the expiration time has elapsed, a reverting modification to the policy settings store in accordance with the one or more prior policy settings.

\* \* \* \* \*